US005650081A

United States Patent [19]
Hudson

[11] Patent Number: 5,650,081
[45] Date of Patent: Jul. 22, 1997

[54] THERMODE SOLDER BLADE WITH ELECTRIC HEATER GREATER THAN FOUR OHMS

[75] Inventor: Edison T. Hudson, Chapel Hill, N.C.

[73] Assignee: Zevatech, Inc., Morrisville, N.C.

[21] Appl. No.: 269,164

[22] Filed: Jun. 29, 1994

[51] Int. Cl.$^6$ ........................................ H05B 1/00
[52] U.S. Cl. ........................ 219/229; 219/85.16; 219/233
[58] Field of Search .............................. 219/229, 233, 219/230, 85.16, 85.1; 228/51

[56] References Cited

U.S. PATENT DOCUMENTS

| | | | |
|---|---|---|---|
| 912,765 | 2/1909 | Wohl et al. | 219/229 |
| 1,238,671 | 8/1917 | Holcomb | 219/229 |
| 2,116,562 | 5/1938 | Cruser | 219/229 |
| 2,336,904 | 12/1943 | Ward | 219/85.16 |
| 3,632,036 | 1/1972 | Halstead | 219/229 |
| 3,651,306 | 3/1972 | Glyptis | 219/230 |
| 3,654,427 | 4/1972 | Schoenwald | 219/241 |
| 3,943,323 | 3/1976 | Smith et al. | 219/85.1 |
| 4,315,128 | 2/1982 | Matcovich et al. | 219/229 |
| 4,752,670 | 6/1988 | Traub et al. | 219/238 |
| 4,804,129 | 2/1989 | Brown et al. | 219/230 |
| 4,871,899 | 10/1989 | DuFrenne | 219/233 |
| 5,010,227 | 4/1991 | Todd | 219/85.16 |
| 5,025,973 | 6/1991 | Newton et al. | 219/238 |
| 5,221,819 | 6/1993 | Schroettle | 219/85.16 |

*Primary Examiner*—Tu B. Hoang
*Attorney, Agent, or Firm*—D'Alessandro & Ritchie

[57] ABSTRACT

A thermode solder blade for soldering small components in industrial soldering equipment comprises a shaped body formed from an electrically-insulating and heat-conducting material having an electrically-conductive heating element formed thereon and spaced away from a solder contacting surface thereof. The electrically-conductive heating element has an electrical resistance greater than about 4 ohms and preferably greater than about 5 ohms.

12 Claims, 2 Drawing Sheets

THERMODE SOLDER BLADE WITH ELECTRIC HEATER GREATER THAN FOUR OHMS

BACKGROUND OF THE INVENTION

1. Field of the Invention

The present invention relates to industrial soldering equipment. More particularly, the present invention relates to a thermode solder blade for soldering small components in industrial soldering equipment.

2. The Prior Art

Conventional soldering systems, such as are used to solder components to printed circuit boards in electronic circuit production environments, have attained widespread use. These systems generally employ an electrically-driven hot bar solder head which is heated to a soldering temperature, such as 700° F. In more complex systems, automatic positioning equipment is used to position the solder head with respect to components to be soldered.

In some automatic soldering applications, the soldering of small component leads is required. These leads may have tolerances of only a few thousandths of an inch. Accurate positioning and tolerance of the soldering head is plainly critical in such applications.

A typical prior art thermode soldering blade is disclosed in U.S. Pat. No. 5,010,227 to Todd. The prior art thermode disclosed in this patent includes a heat conducting body comprising a thin flat elongated member composed of a thermally conductive electrically insulative material. The body is provided with a bottom edge having a substantially flat surface throughout its entire longitudinal length for transferring uniformly thermal energy to the solder material.

A pair of first and second heating elements are disposed on opposite sides of the flat body and are separated from the flat plate by a pair of first and second elongated spacing members. The spacing members are used to electrically isolate the heating elements from the body but to permit heat flow from the heating elements to the body. The heating elements are covered by a pair of first and second heat-confining elongated members for directing the thermal energy generated by the heating elements toward the body.

While the thermode soldering blade disclosed and claimed in this prior art patent is satisfactory for use in many soldering applications, it has several drawbacks which severely limit or prohibit is use in certain applications. The heat-confining elongated members are subject to thermal fatigue and limit the useful life of the thermode.

In addition, while not stated in the patent, the heating elements in actual thermodes made by the assignee of the U.S. Pat. No. 5,010,227 patent all have electrical resistances on the order of less than 4 ohms. The prior art thermodes are designed to be driven by a low-voltage, high-current power supply, sold for use with the soldering system with which the prior-art thermodes are used. This arrangement requires heavy power supply cables which in turn cause positioning problems when attempting to employ precision positioning apparatus in a soldering system.

Another drawback of prior-art thermodes solder blades is the difficulty in designing a blade which can be used for soldering tasks in which the soldering blade encounters obstacles such as components mounted on the circuit board where soldering is to take place. Prior-art thermodes solder blades, such as the one disclosed in U.S. Pat. No. 5,010,227 cannot be formed into custom shapes. The process used to form the heating element requires a flat surface and must cover the entire soldering contact surface uniformly in order to avoid hot spots which would otherwise result in areas where the heating element would be thinned over a non-uniform surface.

It is therefore an object of the present invention to provide a thermode solder blade which overcomes the problems of the prior art.

It is a further object of the present invention to provide a thermode solder blade which may be more easily used in connection with precision positioning equipment.

It is yet another object of the present invention to provide a thermode solder blade which can be formed into custom shapes for soldering on surfaces with obstructions such as mounted components.

BRIEF DESCRIPTION OF THE INVENTION

According to a presently preferred embodiment of the present invention, a thermode solder blade is formed on an electrically insulating and heat conducting body. As presently preferred, the body may be formed from a material such as beryllium oxide, aluminum nitride, or aluminum oxide. The thermode body has a thickness which may be a function of length to provide stability and strength. For example, a thermode according to the present invention having a length of one inch may have a thickness of about 0.08 inches and may be about 0.3 inches in height.

The body has at least one substantially flat face upon which an electrically conductive heating element is formed. The electrically conductive heating element is preferably formed from a refractory metal such as tungsten or tungsten-molybdenum alloy or from other materials such as nichrome.

According to a presently preferred embodiment of the present invention, the electrically conductive heating element is formed on one face or on two opposing faces of the thermode body and has a total resistance greater than about 4 ohms preferably 5 or more ohms.

The thermode body of the present invention has a solder contacting surface which is held to a high degree of flatness, preferably 3–5 microns across its length. The solder contacting surface is located in a region spaced apart from the face(s) of the thermode body on which the heating element (s) is disposed.

According to an alternate embodiment of the present invention, thermode soldering blades may be formed into custom shapes for soldering applications where obstructions on the soldering surface would otherwise make gang soldering impossible. The thermode body is machined to provide a custom profile for the contact surface.

From the within disclosure, persons of ordinary skill in the art will recognize that the thermode body of the present invention can be advantageously tailored to different geometries to accommodate specific component geometries. For example, the thermode body of the present invention may be formed in the shape of a single bar including one or more gaps located so as to avoid a component obstacle on a circuit board. The shape and contour of the solder contacting surface may be designed for specific applications.

An advantage of the thermode soldering blade of the present invention is that it can be driven from a high-voltage, low-current, AC or DC power supply delivering typically about 40 volts at about 4–6 amps. Use of such a power supply allows the power lead cables to be as small as 18 gauge and represents a significant improvement over the prior art. Prior art thermodes requires heavier supply cables which inhibit high accuracy positioning because of the additional torque and inertia which they impose on the mechanical positioning systems with which such thermode soldering blades are used.

DETAILED DESCRIPTION OF A PREFERRED EMBODIMENT

Those of ordinary skill in the art will realize that the following description of the present invention is illustrative only and not in any way limiting. Other embodiments of the invention will readily suggest themselves to such skilled persons.

Figure 1:
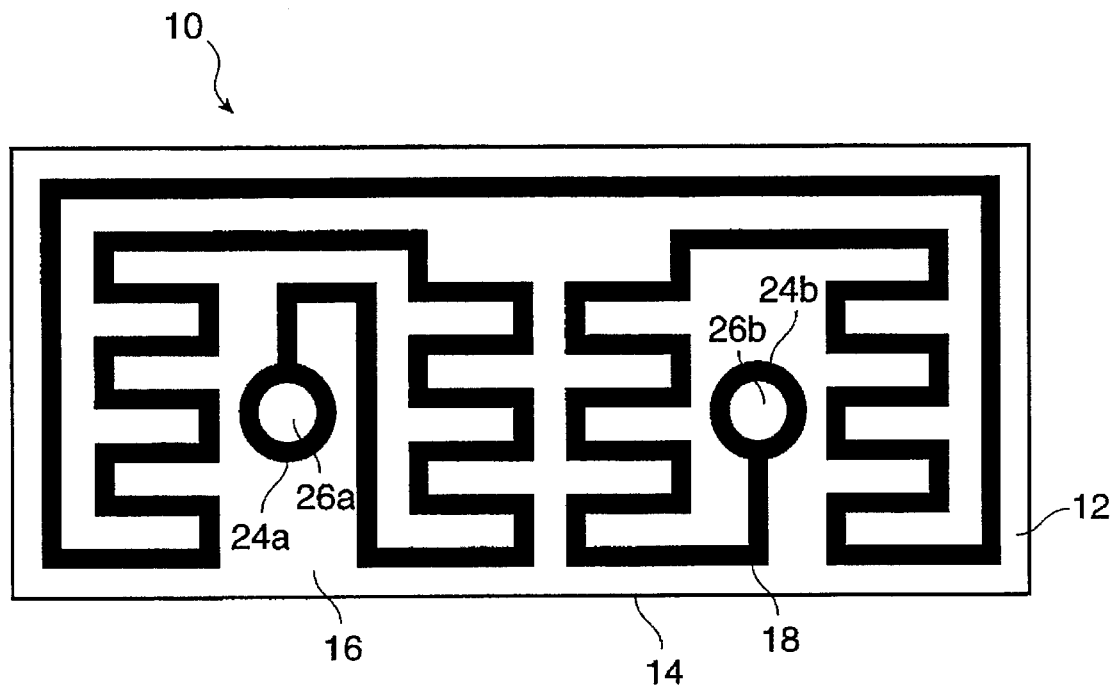
FIG. 1 is a face view of a thermode solder blade according to a first embodiment of the present invention.
Figure 2:
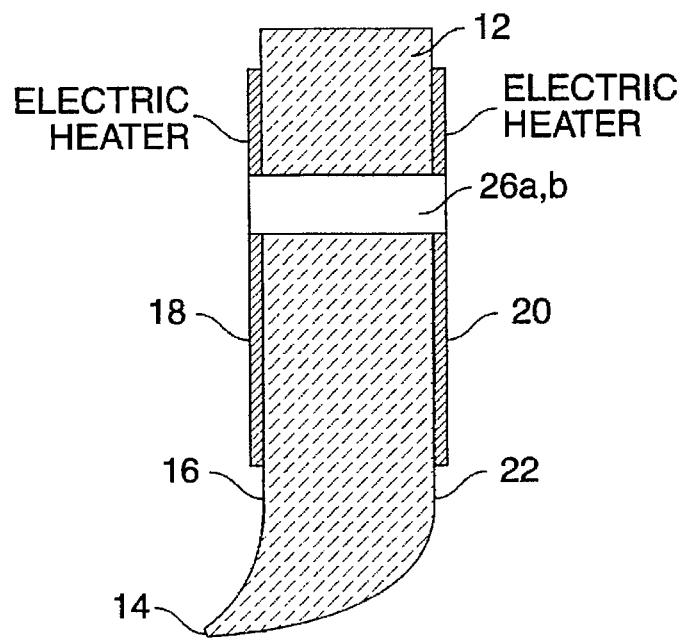
FIG. 2 is an end view of the thermode solder blade of FIG. 1.

Referring first to FIGS. 1 and 2, a thermode solder blade 10 according to the present invention is shown in face and end views, respectively. Thermode solder blade 10 comprises a body 12 formed from a heat conductive and electrically insulative material. Suitable materials for body 12 include beryllium oxide, aluminum nitride, and aluminum oxide. Those of ordinary skill in the art will recognize that the choice of a material from which to form thermode solder blade 10 will be dictated by its physical, mechanical, thermal, and electrical properties, and that other materials having properties similar to the above-named materials could be used.

Body 12 includes a solder contacting surface or edge 14 which may be held to high degree of flatness, preferably about 3-5 microns for precision soldering of small components. As will be appreciated by those of ordinary skill in the art, the thickness of body 12 can be scaled for particular applications and may be a function of its length, the important limit being its sufficient strength. Actual embodiments of the thermode solder head have been fabricated having a length of about one inch, a thickness of 0.08 inches, and a height of 0.3 inches. Body 12 may also be tailored for specific component geometries.

Body 12 has at least one substantially flat face 16 upon which an electrical heating element 18 is formed. In one embodiment of the present invention, a pair of heating elements 18 and 20 are provided on opposing faces 16 and 22 of body 12. The one or more heating elements are preferably formed from a refractory metal such as tungsten or a tungsten-molybdenum alloy. Other materials such as nichrome may be used to form the heating elements. In the view of the embodiment of the invention shown in FIG. 1, contact eyelets 24a and 24b are provided around holes 26a and 26b formed through face 16 of body 12 for the purpose of facilitating electrical contact to the heating elements 18 and 20 via small nuts and bolts or similar fasteners. Those of ordinary skill in the art will recognize that other conventional means may be provided for connecting a power source to heating elements 18 and 20.

The one or more heating elements are preferably formed by screen printing a pattern of a thin layer of the metal to be plated onto the face or faces of the body 12 of thermode 10. The thin layer is then sintered in place and an additional layer of the metal is then plated over the sintered layer. This plating can be satisfactorily performed by use of standard plating procedures or may be performed by commercial plating houses such as Macro-Metallics of San Jose, Calif.

The total resistance of the one or more heating elements of the thermodes soldering blade according to the present invention may determined easily from the resistivity the material from which they are formed, the thickness to which the material is plated, the plating pattern used, and the series or parallel connection of two or more heating elements. According to a presently preferred embodiment of the invention, the total heating element resistance is greater than about 4 ohms and preferably 5 ohms or greater. The resistance of the thermode soldering blade according to the present invention is higher than the resistance of prior art thermode soldering blades and provides distinct advantages over the prior art.

Because of the total resistance of the one or more heating elements, the main advantage of the thermode of the present invention is that it can be driven from a high-voltage, low current, AC or DC power supply. By driving the thermode of the present invention from such a supply having a voltage output of typically about 40 volts or higher and a current of about 4–6 amps, the use of supply cables as small as 18 gauge is possible. Prior art thermodes having lower resistance are driven by low-voltage and high current, which requires the use of 10–12 gauge supply cables. These larger cables are significantly more massive and the contribution by the additional mass to the torque and inertia exhibited by the cables limits the speed and accuracy of thermode solder head positioning in the prior art.

Because the body 12 of thermode 10 is formed from an electrically insulating material and the heating elements are spaced a distance away from the solder contacting surface 14, the thermode of the present invention does not develop an electrical potential at its solder contacting surface 14. This is advantageous since the thermode of the present invention can be used for soldering electrically sensitive components.

According to another aspect of the present invention, a distinct advantage of the thermode soldering blade of the present invention is that it can be formed into specific geometrical shapes. For example, the shape and contour of contacting surface can be altered. The contacting surface of the thermode soldering blade of the present invention may be formed as a single bar with a gap at a selected location along its length to avoid the geometry of an obstacle, such as an electronic component, on a particular soldering surface. It may be scalloped or thin at its contacting surface. This feature of the present invention cannot be implemented with prior art thermode soldering blades such as the one disclosed in U.S. Pat. No. 5,010,227. In such prior-art thermode soldering blades, the heating element wraps around the solder contacting surface of the blade, which must necessarily have uniform dimension to prevent hot spots in the electrical heating element from causing non-uniformities in the temperature along the solder contacting surface. Since the body of the thermode soldering blade of the present invention transfers the heat to the solder contacting surface, the heating element may be located on a position on the body spaced away from the solder contacting surface.

Figure 3:
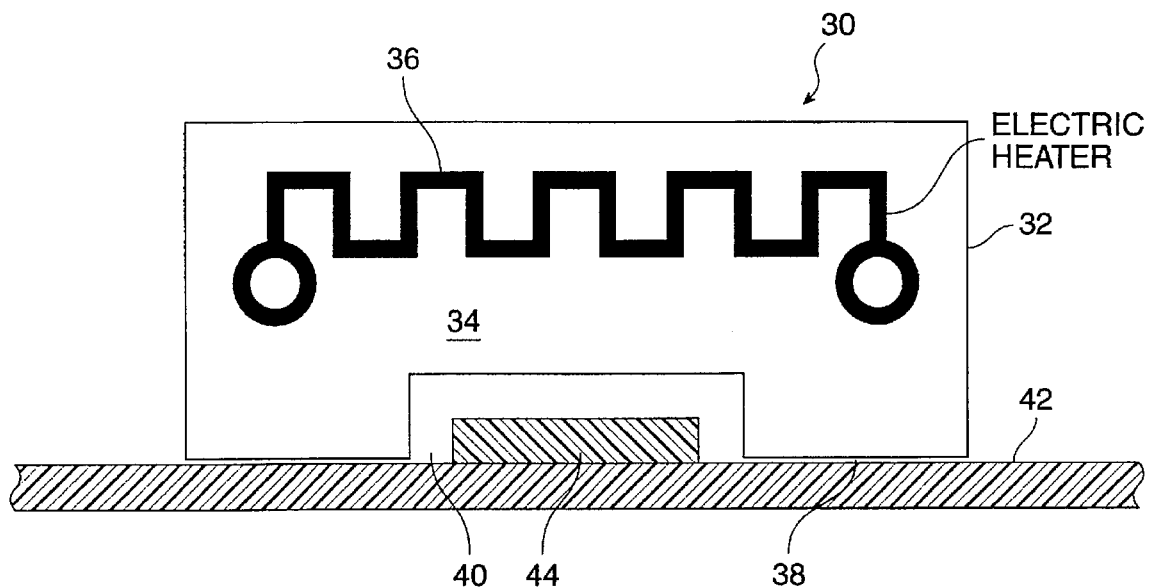
FIG. 3 is a face view of a first illustrative thermode solder blade according to an alternate embodiment of the present invention in which a customized shape is provided for the solder contacting surface.
Figure 4:
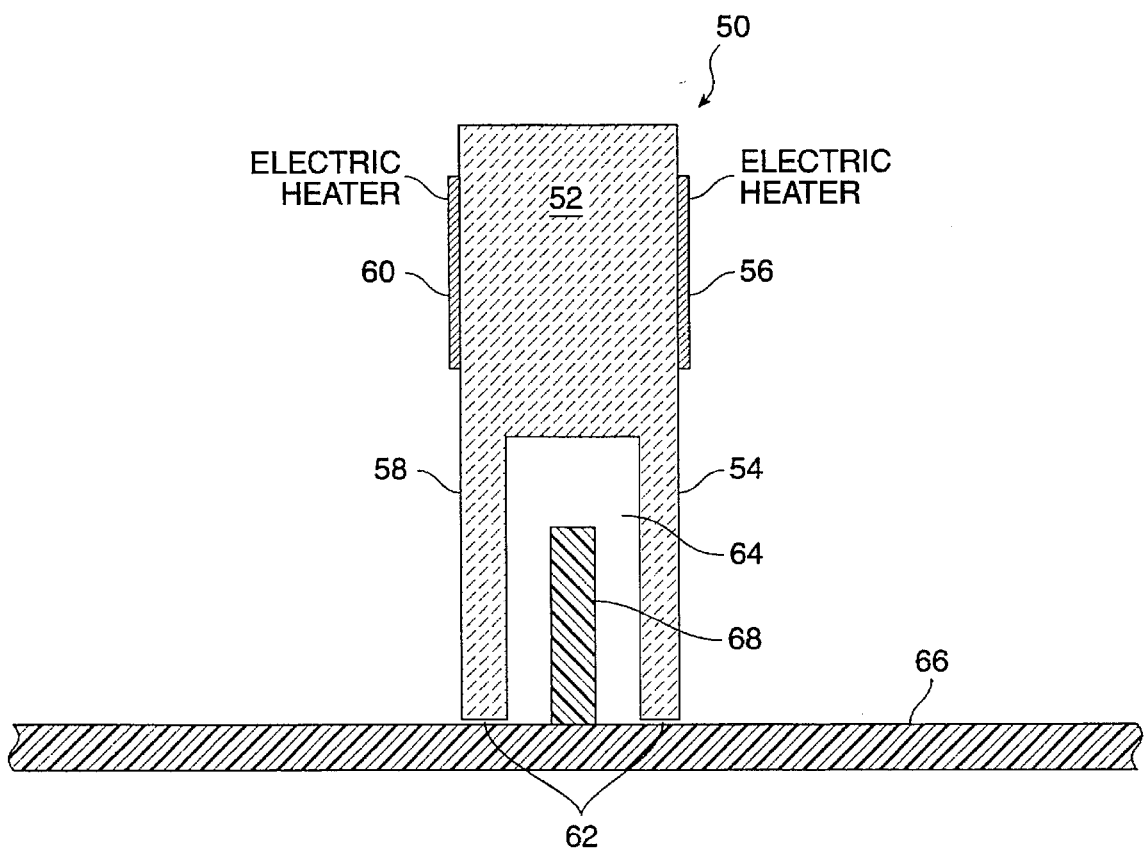
FIG. 4 is a cross-sectional end view of a second illustrative thermode solder blade according to an alternate embodiment of the present invention in which a customized shape is provided for the solder contacting surface.

Referring now to FIGS. 3 and 4, the above-mentioned aspect of the thermode soldering blade of the present invention is illustrated. FIG. 3 is a face view of a first illustrative thermode solder blade according to an alternate embodiment of the present invention in which a customized shape is provided for the solder contacting surface. FIG. 4 is a cross-sectional end view of a second illustrative thermode solder blade according to an alternate embodiment of the present invention in which a customized shape is provided for the solder contacting surface.

Referring first to FIG. 3, thermode soldering blade 30 according to this aspect of the present invention is formed from an elongated body 32 having a first face 34 upon which a heating element 36 is formed as previously disclosed. The opposing face of the body 32 not shown in FIG. 3 may also have a heating element disposed thereon as previously described with respect to the embodiment shown in FIGS. 1 and 2. Body 32 has a solder contacting surface 38 which has a notch 40 formed therein. Thermode soldering blade 30 is shown contacting circuit board 42 upon which a component 44 is mounted. Those of ordinary skill in the art will appreciate that, but for the notch 40 formed in the solder contacting surface of thermode soldering blade 30, component 44 would preclude the use of gang soldering techniques for which such soldering blades are used.

FIG. 4 shows in side cross sectional view another possible example of a custom shaped solder contacting surface for a thermode soldering blade according to the present invention. Thermode soldering blade 50 is formed from an elongated body 52 having a first face 54 upon which a heating element 56 is formed as previously disclosed. The opposing face 58 of the body 32 shown in FIG. 3 may also have a heating element 60 disposed thereon as previously described with respect to the embodiment shown in FIGS. 1 and 2. While the thermode soldering blade 30 of FIG. 3 includes a notch 40 dividing the solder contacting surface 38 into two sections, the solder contacting surface 62 of body 52 is bisected by a lateral groove 64 which runs along its length.

Thermode soldering blade 50 of FIG. 4 is shown contacting circuit board 66 upon which a component 68 is mounted. As in the embodiment shown in FIG. 3, the lateral groove 64 enables the thermode soldering blade 50 to be used in soldering environments like that of circuit board 66 with its otherwise obstructive electronic component 68.

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

What is claimed is:

1. A thermode solder blade comprising:

a unitary body formed from an electrically-insulating and heat-conducting material, said body having first and second opposing faces and a solder contacting surface, a portion of said first opposing face of said body being substantially planar; and a first electrically-conductive heating element formed on said portion of said first opposing face, said heating element spaced away from said solder contacting surface and having an electrical resistance greater than about 4 ohms.

2. The thermode solder blade of claim 1 wherein said body is formed from a material selected from the group comprising beryllium oxide, aluminum nitride and aluminum oxide and said heating element comprises at least one plated layer formed from a material selected from the group comprising tungsten and tungsten-molybdenum alloy.

3. The thermode solder blade of claim 1 wherein said body is generally rectangularly shaped and said solder contacting surface is flat to within about 2 to 3 microns.

4. The thermode solder blade of claim 1 wherein said electrically-conductive heating element has an electrical resistance greater than about 5 ohms.

5. The thermode solder blade of claim 1 further including a second electrically-conductive heating element formed on the other one of said opposing faces and spaced away from said solder contacting surface, said first and second heating elements having a combined electrical resistance greater than about 4 ohms.

6. The thermode solder blade of claim 1 further including a second electrically-conductive heating element formed on the other one of said opposing faces and spaced away from said solder contacting surface, said first and second heating elements having a combined electrical resistance greater than about 5 ohms.

7. A thermode solder blade comprising:

a unitary body formed from an electrically-insulating and heat-conducting material, said body having first and second opposing faces and a solder contacting surface, a portion of said first opposing face of said body being substantially planar; and a first electrically-conductive heating element formed on said portion of said first opposing face, said heating element spaced away from said solder contacting surface and having an electrical resistance greater than about 4 ohms; and said solder contacting surface having a profile shaped to provide clearance for an obstacle to be encountered on a soldering surface.

8. The thermode solder blade of claim 7 wherein said body is formed from a material selected from the group comprising beryllium oxide, aluminum nitride and aluminum oxide and said heating element comprises at least one plated layer formed from a material selected from the group comprising tungsten and tungsten-molybdenum alloy.

9. The thermode solder blade of claim 7 wherein said body is generally rectangularly shaped and said solder contacting surface is flat to within about 2 to 3 microns.

10. The thermode solder blade of claim 7 wherein said electrically-conductive heating element has an electrical resistance greater than about 5 ohms.

11. The thermode solder blade of claim 7 further including a second electrically-conductive heating element formed on the other one of said opposing faces and spaced away from said solder contacting surface, said first and second heating elements having a combined electrical resistance greater than about 4 ohms.

12. The thermode solder blade of claim 7 further including a second electrically-conductive heating element formed on the other one of said opposing faces and spaced away from said solder contacting surface, said first and second heating elements having a combined electrical resistance greater than about 5 ohms.

\* \* \* \* \*